(12) United States Patent
Haas et al.

(10) Patent No.: US 7,377,131 B2
(45) Date of Patent: May 27, 2008

(54) METHOD FOR PRODUCING A GLASS BODY

(75) Inventors: Gottfried Haas, Tirschenreuth (DE); Martin Werner, Mitterteich (DE); Michael Siller, Leonberg (DE); Engelbert Braadt, Mitterteich (DE)

(73) Assignee: Schott Glas, Mainz (DE)

( * ) Notice: Subject to any disclaimer, the term of this patent is extended or adjusted under 35 U.S.C. 154(b) by 310 days.

(21) Appl. No.: 10/271,336

(22) Filed: Oct. 15, 2002

(65) Prior Publication Data

US 2003/0094014 A1 May 22, 2003

(30) Foreign Application Priority Data

Oct. 16, 2001 (DE) ................. 101 50 452

(51) Int. Cl.
*C03B 23/13* (2006.01)
*F24J 2/00* (2006.01)

(52) U.S. Cl. ............... 65/34; 65/43; 126/569; 126/652

(58) Field of Classification Search .......... 65/33.5, 65/34, 36, 42–43; 126/569, 634, 652–653
See application file for complete search history.

(56) References Cited

U.S. PATENT DOCUMENTS

| | | | |
|---|---|---|---|
| 3,952,724 A * | 4/1976 | Pei | 126/655 |
| 3,954,097 A * | 5/1976 | Wilson, Jr. | 126/656 |
| 4,067,315 A * | 1/1978 | Fehlner et al. | 126/636 |
| 4,134,392 A * | 1/1979 | Livermore et al. | 126/657 |
| 4,180,055 A * | 12/1979 | Hudnall | 126/658 |
| 4,282,857 A * | 8/1981 | Pei | 126/584 |
| 4,296,738 A * | 10/1981 | Kelton | 126/656 |
| 4,335,709 A * | 6/1982 | Slaats | 126/635 |
| 4,339,484 A * | 7/1982 | Harding | 428/34.6 |
| 4,416,261 A * | 11/1983 | van der Aa | 126/635 |

(Continued)

FOREIGN PATENT DOCUMENTS

DE 29801531 U1 8/1998

(Continued)

OTHER PUBLICATIONS

Zuqing et al, Tittle: Development and Production of All-Glass Evacuated Tubular Collectors in China, Energy for Sustainable Development vol. III No. 3, Sep. 1996.*

(Continued)

*Primary Examiner*—Carlos Lopez
(74) *Attorney, Agent, or Firm*—Ohlandt, Greeley, Ruggiero & Perle, L.L.P

(57) ABSTRACT

The present invention relates to a method for producing a glass body with at least one inner tube which is closed off on one side and one outer tube which is closed off at least on one side, with the inner tube being connected not coaxially with the floor of the outer tube and the inner tube comprising an opening, with the inner tube being fixed in the outer tube in such a way that the outer tube comprises a projecting portion, a floor is formed by the projecting portion on the outer tube, an opening is formed by the removal of the glass on the inner tube, and the outer tube is evacuated at the end and molten off.

8 Claims, 1 Drawing Sheet

U.S. PATENT DOCUMENTS

| | | | |
|---|---|---|---|
| 4,452,233 A * | 6/1984 | Goodman et al. | 126/653 |
| 4,474,170 A * | 10/1984 | McConnell et al. | 126/636 |
| 4,554,908 A * | 11/1985 | Hanlet et al. | 126/652 |
| 4,615,329 A * | 10/1986 | Takeuchi et al. | 126/684 |
| 4,628,905 A * | 12/1986 | Mills | 126/652 |
| 4,649,903 A * | 3/1987 | Takeuchi et al. | 126/653 |
| 4,834,066 A | 5/1989 | Collins et al. | 126/443 |
| 5,182,912 A * | 2/1993 | Parker et al. | 60/641.8 |
| 5,592,932 A * | 1/1997 | Yeomans | 126/686 |
| 6,637,427 B1 * | 10/2003 | Yeomans | 126/675 |
| 2003/0066638 A1 * | 4/2003 | Qu et al. | 165/186 |

FOREIGN PATENT DOCUMENTS

JP          58203342 A    * 11/1983

OTHER PUBLICATIONS

European Search Report from corresponding Application No. EP 02 02 1838.4 dated Mar. 10, 2004.

* cited by examiner

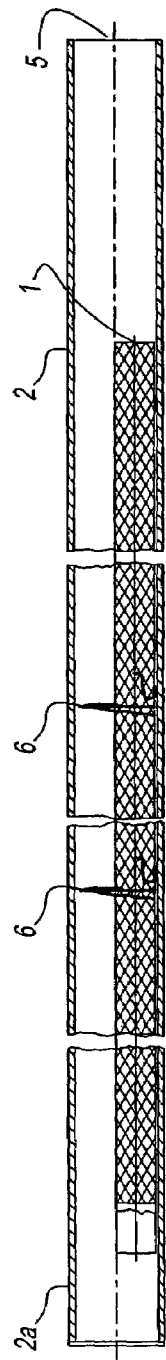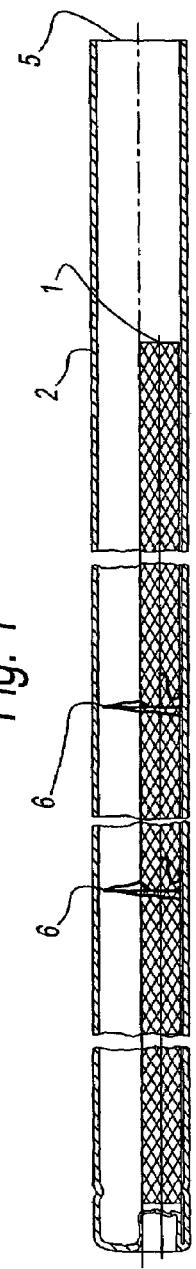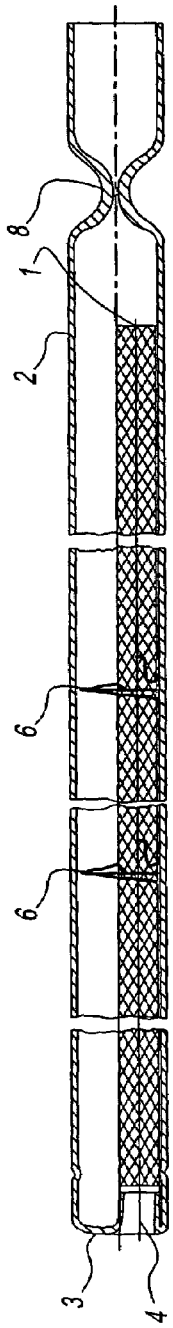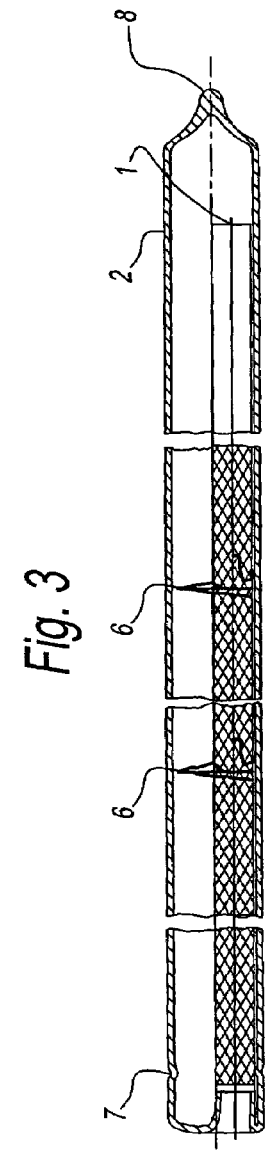

METHOD FOR PRODUCING A GLASS BODY

CROSS-REFERENCE TO RELATED APPLICATION

This application claims priority to DE 101 50 452 filed on Oct. 16, 2001, the entire contents of which are incorporated herein by reference thereto.

BACKGROUND OF THE INVENTION

1. Field of the Invention

The present invention relates to a method for producing a glass body with at least one inner tube which is closed off on one side and one outer tube which is closed off at least on one side, with the inner tube being connected not coaxially with the floor of the outer tube and the inner tube comprising an opening on the floor. Reference is hereby made to DE 298 01 531 U1 which relates to a glass vacuum tube collector.

2. Description of Related Art

According to conventional methods for producing a glass body with an outer tube and an inner tube situated concentrically therein according to the Sydney principle, the inside and outer tubes are clamped with a mandrel and molten with each other into a floor. All work cycles for melting the tubes must be performed in the clamped state. Since it is necessary to set up many stations in the case of larger quantities, the adherence to the required quality is not ensured. It is difficult to maintain the same uniform quality in the glass bodies.

BRIEF SUMMARY OF THE INVENTION

It is the object of the present invention to provide an economic and environmentally friendly method for producing a glass body with at least one inner tube which is closed off on one side and an outer tube which is closed off at least on one side, with the inner tube not being connected coaxially with the floor of the outer tube and the inner tube having an opening in the floor.

The object of the present invention is achieved by a method for producing a glass body with at least one inner tube which is closed off on one side and an outer tube which is closed off at least on one side, with the inner tube not being connected coaxially with the floor of the outer tube and the inner tube having an opening in the floor in which the inner tube is fixed in the outer tube in such a way that the outer tube comprises a projecting portion, a floor is formed by the projecting portion on the outer tube, an opening is formed by removing the glass on the inner tube and the outer tube is evacuated at the end and is molten off.

The method in accordance with the invention allows producing a long-time vacuum-stable glass body in which all functional layers are protected from corrosion influences by the vacuum. Environmental influences cannot act on the glass body. The functional layers do not require any further protective measures.

A preferred embodiment of the method in accordance with the invention is that the inner tube is fixed on the outer tube by at least two spacers. As a result, no further holding is necessary by outside acting appartuses. As a result, the further processing steps can be performed in separate work cycles.

A preferred embodiment of the method in accordance with the invention is that a water glass is connected between the inner tube and the spacers.

A preferred embodiment of the method in accordance with the invention is that a bead is shaped in a centric manner close to the floor. The bead is suitable for fixing the glass vessel in a collector.

A preferred embodiment of the method in accordance with the invention is that the floor is drawn off with a mandrel on the inner tube. For this purpose a mandrel made of a special glass contact material with special properties is used. During the glass removal the glass sticks to the mandrel. The mandrel pulls off the soft glass. The glass is thrown off after cooling off.

A preferred embodiment of the method in accordance with the invention is that air is injected through the end of the outer tube during several melting processes. As a result, the originally sharp-edged transitional portions are rounded off and thus the glass tensions are reduced and the mechanical stability is considerably increased.

A preferred embodiment of the method in accordance with the invention is that a pump nozzle is formed at the end of the outer tube, the outer tube is evacuated, it is preferably charged with an inert gas or an inert gas mixture and the pump nozzle is closed off. According to the method in accordance with the invention the glass body can favourably be sealed off at the face side for evacuation. A vacuum-tight plug is produced by the suction on the face side.

A preferred embodiment of the method in accordance with the invention is that the inner tube is coated from the outside prior to the fixing in the outer tube. As a result of the method in accordance with the invention, a coated absorber tube can be connected with the outer tube for producing a collector tube.

A preferred embodiment of the method in accordance with the invention is that the outer tube is partly coated from the inside prior to fixing with the inner tube. As a result of the method in accordance with the invention it is possible to connect an inwardly coated cladding tube with the inner tube for producing a collector tube.

The object of the present invention is achieved by a method for producing a glass body including supporting a first tube on a pair of spacers within an inner dimension of a second tube such that the first and second tubes are not concentric with one another and such that a first end of the second tube extends beyond a first end of the first tube, forming a floor of the glass body using the first ends of the first and second tubes, and forming a sealed space between the first and second tubes by sealing a second end of the second tube.

A preferred embodiment of the method in accordance with the invention is that the method includes evacuating the sealed space through the pump nozzle, charging the sealed space with a gas, and sealing the pump nozzle.

A preferred embodiment of the method in accordance with the invention is that the method also includes reducing glass tension in the glass body by injecting air into the sealed space through the second end of the second tube at least during the forming of the floor.

In accordance with the invention the glass body is intended to be used for heating gaseous, liquid and solid media. Absorber tube and cladding tube are very effective for solar heating in the combination as a collector tube.

In accordance with the invention the glass body is intended to be used as a collector tube in a thermal solar collector. The collector tubes thus produced are well-suited for the installation in solar collectors.

The invention is now explained in closer detail by reference to the enclosed drawing. FIGS. 1, 1a, 2, 3 and 4 represent process steps of the method in accordance with the invention.

BRIEF DESCRIPTION OF DRAWINGS

FIG. 1 is a longitudinal sectional view of a glass body according to an exemplary embodiment of the present invention after a first manufacturing step;

FIG. 1a is a cross-sectional view of the glass body of FIG. 1;

FIG. 2 is a longitudinal sectional view of the glass body after a second manufacturing step;

FIG. 3 is a longitudinal sectional view of the glass body after a third manufacturing step; and FIG. 4 is a longitudinal sectional view of the completed glass body.

DETAILED DESCRIPTION OF THE INVENTION

FIG. 1 shows a longitudinal sectional view through the glass body with the outer tube (2), in which the inner tube (1) is fixed with two spacers (6). The inner tube (1) is coated prior to fixing in the outer tube (2). The outer tube (2) is coated partly on the inside prior to fixing with the inner tube (1). The spacers (6) a preferably made of metal. The metal spacers (6) are arranged in such a way that they rest on up to 90 percent of the inside diameter of the outer tube (2) and embrace up to 90 percent of the outside diameter of the inner tube (1). This ensures that the smaller distance between the outer tube (2) and the eccentrically extending inner tube (1) remains permanently constant. FIG. 1a shows a cross section and the form of the spacers (6). The inner tube (1) is fixed in the outer tube (2) in such a way that the outer tube (2) shows a projecting portion (2a).

FIG. 1a represent a cross-sectional view through the subject matter of FIG. 1.

FIG. 2 shows a longitudinal sectional view through the glass body, with a floor (3) being formed centrically on the outer tube (2) by the projecting part (2a) and the bead (7) close to the floor (3).

FIG. 3 shows a longitudinal sectional view through the glass body, with an opening (4) being formed by removing the glass on the inner tube (1), this being in such a way that the floor (3) is removed with a mandrel on the inner tube (1). A pump nozzle (8) is formed at the end (5) of the outer tube (2). The outer tube (2) is evacuated or can be filled with noble gas or a noble gas mixture through said nozzle.

FIG. 4 shows a longitudinal sectional view through the completed the glass body, with the pump nozzle (8) being closed off.

The invention claimed is:

1. A method for producing a glass body comprising:
   supporting a first tube on a pair of spacers within an inner dimension of a second tube such that said first and second tubes are not concentric with one another and such that a first end of said second tube extends beyond a first end of said first tube;
   forming a floor of the glass body using said first ends of said first and second tubes; and
   forming a sealed space between said first and second tubes by sealing a second end of the second tube.

2. The method as in claim 1, further comprising:
   forming a pump nozzle at said second end of the second tube, said pump nozzle being in fluid communication with said sealed space.

3. The method as in claim 2, further comprising:
   evacuating said sealed space through said pump nozzle;
   charging said sealed space with a gas; and
   sealing said pump nozzle.

4. The method as in claim 1, further comprising reducing glass tension in the glass body by injecting air into said sealed space through said second end of said second tube at least during the forming of said floor.

5. The method as in claim 1, further comprising forming a bead at said first end of said second tube, said bead for fixing the glass body in a collector.

6. The method as in claim 1, wherein said pair of spacers rest on up to 90 percent of said inner dimension of said second tube and embrace up to 90 percent of an outer dimension of said first tube.

7. The method as in claim 1, wherein said first tube has an outer surface that is coated prior to being supported in said inner dimension of said second tube.

8. The method as in claim 1, wherein said second tube has an inner surface that is at least partly coated prior to having said first tube supported in said inner dimension.

* * * * *